US008275686B2

(12) United States Patent
Ahn et al.

(10) Patent No.: US 8,275,686 B2
(45) Date of Patent: Sep. 25, 2012

(54) METHODS FOR MEASURING HEDGING VALUE-AT-RISK AND PROFITABILITY

(75) Inventors: Stephen J. Ahn, Yonkers, NY (US); Oded Hauser, Matawan, NJ (US); John J. Yao, New York, NY (US)

(73) Assignee: The Bank of New York Mellon Corporation, New York, NY (US)

( * ) Notice: Subject to any disclaimer, the term of this patent is extended or adjusted under 35 U.S.C. 154(b) by 813 days.

(21) Appl. No.: 11/626,665

(22) Filed: Jan. 24, 2007

(65) Prior Publication Data

US 2008/0177673 A1    Jul. 24, 2008

(51) Int. Cl.
*G06Q 40/00* (2012.01)
(52) U.S. Cl. .................................................. 705/36 R
(58) Field of Classification Search .................... 705/35, 705/36 R
See application file for complete search history.

(56) References Cited

U.S. PATENT DOCUMENTS

2005/0187851 A1 * 8/2005 Sant ................................ 705/36
2007/0156555 A1 * 7/2007 Orr ................................. 705/35

OTHER PUBLICATIONS

Kocagil, Ahmet and Mezrin, Vadim, "Basis Risk in Structured Finance Transactions: T-Bill, CP, and Prime versus USD LIBOR", Sep. 15, 2006.*

Rubin, David et al., "Report on the Historical Relationship Between BMA and LIBOR", Aug. 2003.*
Bonow, John, "Swap Update and Briefing Public Utility District No. 1 of Chelan County", Aug. 1, 2005.*
Goldman Sachs, Overview of the Municipal Swap Marketplace: Growth, Usage, and Future. National Association of State Treasurers Conference, Dec. 6, 2004.*
Orr, Peter and Balasanov, Yuri, "Models for Simulating BMA and LIBOR Interest Rates", Intuitive Analytics, Nov. 21, 2005.*

* cited by examiner

*Primary Examiner* — Eric T Wong
(74) *Attorney, Agent, or Firm* — Pillsbury Winthrop Shaw Pittman LLP

(57) ABSTRACT

Systems and methods for measuring value-at-risk and profitability of hedging in relation to BMA debt obligations are provided using rigorous statistical solutions that address problems associated with municipalities involved in swap hedging face. Various embodiments permit users to quantify POL hedging basis risk through a VAR-style loss measurement and statistics measuring the profitability of a hedge, those statistics including gain durability and gain/loss ratio. Various aspects introduce significant innovation to risk management practices, particularly for tax-exempt issuers of debt. Certain embodiments of this disclosure facilitate better management of hedging risk, analysis of hedges using POL vs. BMA and provide guidance for analyzing the risk existing in an existing portfolio of POL swap hedges to better inform decision-making regarding use of hedging risk for profit or to lay off risk.

17 Claims, 30 Drawing Sheets

Hedging with BMS Swaps – No Basis Risk

Hedging with Percentage of Libor Swaps – Basis Risk

| No.: | 1 |
|---|---|
| 500 → Start Date: | 15-Dec-05 |
| 502 → End Date: | 15-Dec-25 |
| 504 → Swap Rt. Spread (bps): | 40 |
| 506 → Int. Period (M,Q,S,A): | M |

POL Trade Definition

Figure 5a

| Date | Principal Schedule |
|---|---|
| 15-Dec-05 | 50,000,000 |
| 15-Jan-06 | 49,866,667 |
| 15-Feb-06 | 49,733,333 |
| 15-Mar-06 | 49,600,000 |
| 15-Apr-06 | 49,466,667 |
| 15-May-06 | 49,333,333 |
| 15-Jun-06 | 49,200,000 |
| 15-Jul-06 | 49,066,667 |

Amort. Schedule

Figure 5b

Current Market Rates

Discounting Rates for Valuation of Flows

| | |
|---|---|
| 80 → Pr[Tax Change in 5 Yrs] | 15% |
| 82 → E[Tax Change Size] | -3.0% |
| 84 → 90% C.I +/- Bands | 3.0% |

Tax Change Risk Modeling Parameter

Figure 8

| | 91 ↓ No Tax Risk | 93 ↓ With Tax Risk | 95 ↓ Break-Even Points |
|---|---|---|---|
| 90 → GLR | 0.51 | -0.21 | 0.00 |
| 92 → GD | 68.1% | 41.7% | 50.0% |
| 94 → Sharpe | 0.47 | 0.01 | 0.30 |
| 96 → This Deal VAR | -9,919,751 | | |

Current Deal Risk-Return Metrics

| | Analysis Date | 1-Mar-06* |
|---|---|---|
| | Analyze This Deal | |
| | This Deal No. | 4* |
| | Run VAR (All Deals) | |

Tax Change Risk Modeling Parameters

| Pr(Tax Change in 5 Yrs) | 15%* |
|---|---|
| E(Tax Change Size) | -3.0%* |
| 90% C.I. +/- Bands | 3.0%* |
| E(Time of Tax Change) | 30.8 |

VAR Analysis

| C.I. | 99.0%* | (90.0% to 99.5%) |
|---|---|---|
| Horizon(Mos) | 6.0* | |
| No. Scenarios | 500,000* | (Up to 500,000) |

Current Market Rates (+ Discount Curve on seperate sheet)

| Period | CurrLibor | CurrBMA | 1-Lag Libor | 1-Lag BMA |
|---|---|---|---|---|
| M | 4.350%* | 2.520%* | 3.698%* | 2.142%* |
| Q | 4.350%* | 2.520%* | 3.698%* | 2.142%* |
| S | 4.350%* | 2.520%* | 3.698%* | 2.142%* |
| A | 4.350%* | 2.520%* | 3.698%* | 2.142%* |

TO FIG.11A-3

Transaction/Portfolio Analysis

| Trade No. | 4 |
|---|---|
| Start Date | 12/15/2005 |
| End Date | 12/15/2025 |
| Swap Rt Spread (bps) | 40 |
| Int Period(M,Q,S,A) | A |

Amort Schedule

| Pd End Date | Principal Schedule |
|---|---|
| 15-Dec-05 | 50,000,000 |
| 15-Dec-06 | 48,400,000 |
| 15-Dec-07 | 46,800,000 |
| 15-Dec-08 | 45,200,000 |
| 15-Dec-09 | 43,600,000 |
| 15-Dec-10 | 42,000,000 |
| 15-Dec-11 | 40,400,000 |
| 15-Dec-12 | 38,800,000 |
| 15-Dec-13 | 37,200,000 |
| 15-Dec-14 | 35,600,000 |
| 15-Dec-15 | 34,000,000 |
| 15-Dec-16 | 32,400,000 |
| 15-Dec-17 | 30,800,000 |
| 15-Dec-18 | 29,200,000 |
| 15-Dec-19 | 27,600,000 |
| 15-Dec-20 | 26,000,000 |
| 15-Dec-21 | 24,400,000 |
| 15-Dec-22 | 22,800,000 |
| 15-Dec-23 | 21,200,000 |
| 15-Dec-24 | 19,600,000 |
| 15-Dec-25 | 18,000,000 |

Model Notes:

"*" = "*" cells represent user input cells; where a column heading contains *, each entry is a user input entry "Gain Durability" is defined as Probability (Swap Spread Gains > = BMA-Libor Spread Losses)

"Gain Loss Ratio" is the ratio of the synthetically purchased put option (potential gains) and

Current Deal Risk-Return Metrics

|  | No Tax Risk | With Tax Risk | Break-Even Points |
|---|---|---|---|
| GLR | 0.51 | -0.21 | 0.00 |
| GD | 68.1% | 41.7% | 50.0% |
| Sharpe | 0.47 | 0.01 | 0.30 |
| This Deal VAR | (9,550,972) | | |

Portfolio VAR (35,844,621)

BMA- Libor Volatility Risk Excluding Tax Change Risk

FROM FIG. 11A-1

| Calendar | Principal Amort Schedule | Epsilon 1 Lag | Epsilon 2 Lag | Incremental Epsilon | Expected BMA-Libor Spread | Expected Gain/Loss Amount | No Tax Volatility | Gain Option Value |
|---|---|---|---|---|---|---|---|---|
| 1-Mar-06 | | | | | | | | |
| 15-Dec-06 | 48,400,000 | 0.000 | 0.000 | 1.000 | 0.2610% | 67,276 | 0.562% | 145,539 |
| 15-Dec-07 | 46,800,000 | 0.456 | 0.000 | 1.000 | 0.1518% | 116,157 | 0.678% | 193,158 |
| 15-Dec-08 | 45,200,000 | 0.663 | 0.058 | 1.000 | 0.0843% | 142,716 | 0.738% | 216,414 |
| 15-Dec-09 | 43,600,000 | 0.784 | 0.064 | 1.000 | 0.0472% | 153,835 | 0.769% | 224,485 |
| 15-Dec-10 | 42,000,000 | 0.851 | 0.099 | 1.000 | 0.0264% | 156,926 | 0.785% | 224,708 |
| 15-Dec-11 | 40,400,000 | 0.869 | 0.108 | 1.000 | 0.0147% | 155,646 | 0.795% | 220,687 |
| 15-Dec-12 | 38,800,000 | 0.910 | 0.113 | 1.000 | 0.0082% | 152,003 | 0.800% | 214,382 |
| 15-Dec-13 | 37,200,000 | 0.922 | 0.115 | 1.000 | 0.0046% | 147,086 | 0.803% | 205,845 |
| 15-Dec-14 | 35,600,000 | 0.928 | 0.117 | 1.000 | 0.0026% | 141,483 | 0.804% | 198,646 |
| 15-Dec-15 | 34,000,000 | 0.932 | 0.118 | 1.000 | 0.0014% | 135,511 | 0.805% | 190,091 |
| 15-Dec-16 | 32,400,000 | 0.934 | 0.118 | 1.000 | 0.0008% | 129,339 | 0.806% | 181,344 |
| 15-Dec-17 | 30,800,000 | 0.935 | 0.118 | 1.000 | 0.0004% | 123,061 | 0.806% | 172,494 |
| 15-Dec-18 | 29,200,000 | 0.936 | 0.119 | 1.000 | 0.0003% | 116,727 | 0.806% | 163,589 |
| 15-Dec-19 | 27,600,000 | 0.936 | 0.119 | 1.000 | 0.0001% | 110,361 | 0.806% | 154,655 |
| 15-Dec-20 | 26,000,000 | 0.936 | 0.119 | 1.000 | 0.0001% | 103,980 | 0.806% | 145,705 |
| 15-Dec-21 | 24,400,000 | 0.937 | 0.119 | 1.000 | 0.0000% | 97,589 | 0.806% | 136,747 |
| 15-Dec-22 | 22,800,000 | 0.937 | 0.119 | 1.000 | 0.0000% | 91,194 | 0.806% | 127,784 |
| 15-Dec-23 | 21,200,000 | 0.937 | 0.119 | 1.000 | 0.0000% | 84,797 | 0.806% | 118,819 |
| 15-Dec-24 | 19,600,000 | 0.937 | 0.119 | 1.000 | 0.0000% | 76,398 | 0.806% | 109,853 |
| 15-Dec-25 | 18,000,000 | 0.937 | 0.119 | 1.000 | 0.0000% | 71,999 | 0.806% | 100,886 |
| 15-Dec-26 | - | 0.937 | 0.119 | 1.000 | 0.0000% | - | 0.806% | - |

FROM FIG. 11A-2

| Loss Option Value | Gain Durability | Wgt Avg Gain/Loss Ratio | Wgt Avg Sharpe Ratio | DFs | PV Gain/Loss | Prob of Tax Rt Chg | Assumed Size of Chg | Stressed BMA-Libor +Tax Change | Expected Gain/Loss Amount |
|---|---|---|---|---|---|---|---|---|---|
|  | 68.1% | 0.508 | 47.1% |  |  |  |  |  |  |
| 78,263 | 59.8% | 0.62 | 0.247 | 0.962187 | 64,732 | 2.54% | -3.00% | 0.3372% | 30,385 |
| 77,002 | 64.3% | 0.92 | 0.366 | 0.916466 | 106,454 | 5.66% | -3.00% | 0.3215% | 36,724 |
| 73,698 | 66.6% | 1.08 | 0.428 | 0.872802 | 124,563 | 8.68% | -3.00% | 0.3447% | 24,976 |
| 70,649 | 67.7% | 1.16 | 0.459 | 0.831329 | 127,886 | 11.60% | -3.00% | 0.3953% | 2,063 |
| 67,780 | 68.3% | 1.20 | 0.476 | 0.791817 | 124,258 | 14.43% | -3.00% | 0.4593% | (24,895) |
| 65,041 | 68.6% | 1.22 | 0.485 | 0.753417 | 117,266 | 17.17% | -3.00% | 0.5297% | (52,418) |
| 62,376 | 68.8% | 1.23 | 0.490 | 0.716593 | 108,924 | 19.82% | -3.00% | 0.6029% | (78,740) |
| 59,759 | 68.9% | 1.24 | 0.493 | 0.681213 | 100,197 | 22.39% | -3.00% | 0.6762% | (102,757) |
| 57,163 | 68.9% | 1.25 | 0.494 | 0.647249 | 91,575 | 24.87% | -3.00% | 0.7487% | (124,124) |
| 54,580 | 69.0% | 1.25 | 0.495 | 0.614773 | 83,308 | 27.27% | -3.00% | 0.8196% | (142,667) |
| 52,005 | 69.0% | 1.25 | 0.496 | 0.583395 | 75,456 | 29.60% | -3.00% | 0.8889% | (158,417) |
| 49,433 | 69.0% | 1.25 | 0.496 | 0.553402 | 68,102 | 31.86% | -3.00% | 0.9561% | (171,287) |
| 46,863 | 69.0% | 1.25 | 0.496 | 0.524877 | 61,267 | 34.04% | -3.00% | 1.0213% | (181,422) |
| 44,294 | 69.0% | 1.25 | 0.496 | 0.497489 | 54,903 | 36.14% | -3.00% | 1.0845% | (188,918) |
| 41,725 | 69.0% | 1.25 | 0.496 | 0.471378 | 49,014 | 38.19% | -3.00% | 1.1459% | (193,922) |
| 39,157 | 69.0% | 1.25 | 0.496 | 0.446898 | 43,612 | 40.17% | -3.00% | 1.2051% | (196,449) |
| 36,590 | 69.0% | 1.25 | 0.496 | 0.423995 | 38,666 | 42.08% | -3.00% | 1.2625% | (196,651) |
| 34,022 | 69.0% | 1.25 | 0.496 | 0.402172 | 34,103 | 43.93% | -3.00% | 1.3181% | (194,629) |
| 31,454 | 69.0% | 1.25 | 0.496 | 0.381370 | 29,899 | 45.73% | -3.00% | 1.3720% | (190,510) |
| 28,886 | 69.0% | 1.25 | 0.496 | 0.361545 | 26,031 | 47.47% | -3.00% | 1.4241% | (184,330) |
| - |  |  | 0.496 | 0.342663 | - | 49.15% | -3.00% | 1.4745% | - |

FROM FIG. 11A-3    TO FIG. 11A-7    TO FIG. 11A-5

FIG. 11A-4

| With Tax Volatility | Gain Option Value | Loss Option Value | Gain Durability | Wgt Avg Gain/Loss Ratio | Wgt Avg Sharpe Ratio | PV Gain/Loss |
|---|---|---|---|---|---|---|
| 0.824% | 174,716 | 144,331 | 41.7% | -0.209 | 0.9% | 29,236 |
| 1.118% | 227,728 | 191,004 | 53.0% | 0.19 | 0.1 | 33,656 |
| 1.317% | 250,182 | 225,206 | 52.8% | 0.18 | 0.1 | 21,799 |
| 1.466% | 256,127 | 254,064 | 51.7% | 0.11 | 0.0 | 1,715 |
| 1.587% | 253,736 | 278,631 | 50.1% | 0.01 | 0.0 | (19,712) |
| 1.689% | 246,846 | 299,264 | 48.5% | (0.09) | - | (39,493) |
| 1.777% | 237,490 | 316,229 | 46.9% | (0.19) | - | (56,424) |
| 1.853% | 226,781 | 329,538 | 45.5% | (0.29) | - | (69,999) |
| 1.921% | 215,346 | 339,469 | 44.1% | (0.37) | - | (80,339) |
| 1.982% | 203,553 | 346,220 | 42.8% | (0.46) | - | (87,708) |
| 2.036% | 191,623 | 350,039 | 41.6% | (0.53) | - | (92,419) |
| 2.085% | 179,714 | 351,000 | 40.5% | (0.60) | - | (94,790) |
| 2.130% | 167,915 | 349,336 | 39.5% | (0.67) | - | (95,224) |
| 2.170% | 156,292 | 345,209 | 38.5% | (0.73) | - | (93,985) |
| 2.206% | 144,884 | 338,806 | 37.6% | (0.79) | - | (91,410) |
| 2.239% | 133,736 | 330,185 | 36.8% | (0.85) | - | (87,793) |
| 2.269% | 122,864 | 319,515 | 36.0% | (0.90) | - | (83,379) |
| 2.297% | 112,283 | 306,912 | 35.2% | (0.96) | - | (78,274) |
| 2.322% | 101,997 | 292,507 | 34.5% | (1.01) | - | (72,655) |
| 2.344% | 92,022 | 276,352 | 33.8% | (1.05) | - | (66,643) |
| 2.365% | - | - | 33.1% | (1.10) | - | - |
|  |  |  | 32.5% | - | - |  |

FROM FIG. 11A-4

FIG. 11A-5

FROM FIG. 11A-3

TO FIG. 11A-7

| Periodicity | 12 |
| --- | --- |
| Vol | 0.56% |
| Corr1 | 45.57% |
| Corr2 | 26.54% |

| | |
| --- | --- |
| CurrLibor | 4.35% |
| CurrBMA | 2.52% |
| 1-LagLibor | 3.70% |
| 1-LagBMA | 2.14% |
| Libor Swap Pct. | 68% |

| Period Name | Period Code | Period Months | Vol | Corr1 | Corr2 |
| --- | --- | --- | --- | --- | --- |
| Monthly | M | 1 | 0.415% | 42.4% | 20.5% |
| Quarterly | Q | 3 | 0.415% | 42.4% | 20.5% |
| Semi-Annual | S | 6 | 0.562% | 45.6% | 26.5% |
| Annual | A | 12 | 0.562% | 45.6% | 26.5% |

FROM FIG. 11A-4

| CurrLibor | CurrBMA | 1-Lag Libor | 1-Lag BMA |
|---|---|---|---|
| 4.350% | 2.520% | 3.698% | 2.142% |
| 4.350% | 2.520% | 3.698% | 2.142% |
| 4.350% | 2.520% | 3.698% | 2.142% |
| 4.350% | 2.520% | 3.698% | 2.142% |

FROM FIG.11A-6

FIG. 11B-1

| | A | B | C | D | E | F |
|---|---|---|---|---|---|---|
| 2 | | | Portfolio Basket Definitions | | | |
| 3 | | No. | 1 | | 2 | |
| 4 | | Start Date | 15-Dec-05* | | 15-Dec-05* | |
| 5 | | End Date | 15-Dec-25* | | 15-Dec-25* | |
| 6 | *Initial BMA - P.O.L.* | Swap Rt Spread (bps) | 40* | | 40* | |
| 7 | | Int Period (M,Q,S,A) | M* | | Q* | |
| 8 | | VAR | (8,681,439) | | (8,909,107) | |
| 9 | | | | | | |
| 10 | | | Amort Schedule | | | |
| 11 | | | Date* | Principal Schedule* | Date* | Principal Schedule* |
| 12 | | | 15-Dec-05 | 50,000,000 | 15-Dec-05 | 50,000,000 |
| 13 | | | 15-Jan-06 | 49,866,667 | 15-Mar-06 | 49,600,000 |
| 14 | | | 15-Feb-06 | 49,733,333 | 15-Jun-06 | 49,200,000 |
| 15 | | | 15-Mar-06 | 49,600,000 | 15-Sep-06 | 48,800,000 |
| 16 | | | 15-Apr-06 | 49,466,667 | 15-Dec-06 | 48,400,000 |
| 17 | | | 15-May-06 | 49,333,333 | 15-Mar-07 | 48,000,000 |
| 18 | | | 15-Jun-06 | 49,200,000 | 15-Jun-07 | 47,600,000 |
| 19 | | | 15-Jul-06 | 49,066,667 | 15-Sep-07 | 47,200,000 |
| 20 | | | 15-Aug-06 | 49,933,333 | 15-Dec-07 | 46,800,000 |
| 21 | | | 15-Sep-06 | 48,800,000 | 15-Mar-08 | 46,400,000 |
| 22 | | | 15-Oct-06 | 48,666,667 | 15-Jun-08 | 46,000,000 |
| 23 | | | 15-Nov-06 | 48,533,333 | 15-Sep-08 | 45,600,000 |
| 24 | | | 15-Dec-06 | 48,400,000 | 15-Dec-08 | 45,200,000 |
| 25 | | | 15-Jan-07 | 48,266,667 | 15-Mar-09 | 44,800,000 |
| 26 | | | 15-Feb-07 | 48,133,333 | 15-Jun-09 | 44,400,000 |

| G | H | I | J |
|---|---|---|---|
| 3 | | 4 | |
| 15-Dec-05* | | 15-Dec-05* | |
| 15-Dec-25* | | 15-Dec-25* | |
| 40* | | 40* | |
| S* | | A* | |
| (8,703,102) | | (9,550,972) | |

| Date* | Principal Schedule* | Date* | Principal Schedule* |
|---|---|---|---|
| 15-Dec-05 | 50,000,000 | 15-Dec-05 | 50,000,000 |
| 15-Jun-06 | 49,200,000 | 15-Dec-06 | 48,400,000 |
| 15-Dec-06 | 48,400,000 | 15-Dec-07 | 46,800,000 |
| 15-Jun-07 | 47,600,000 | 15-Dec-08 | 45,200,000 |
| 15-Dec-07 | 46,800,000 | 15-Dec-09 | 43,600,000 |
| 15-Jun-08 | 46,000,000 | 15-Dec-10 | 42,000,000 |
| 15-Dec-08 | 45,200,000 | 15-Dec-11 | 40,400,000 |
| 15-Jun-09 | 44,400,000 | 15-Dec-12 | 38,800,000 |
| 15-Dec-09 | 43,600,000 | 15-Dec-13 | 37,200,000 |
| 15-Jun-10 | 42,800,000 | 15-Dec-14 | 35,600,000 |
| 15-Dec-10 | 42,000,000 | 15-Dec-15 | 34,000,000 |
| 15-Jun-11 | 41,200,000 | 15-Dec-16 | 32,400,000 |
| 15-Dec-11 | 40,400,000 | 15-Dec-17 | 30,800,000 |
| 15-Jun-12 | 39,600,000 | 15-Dec-18 | 29,200,000 |
| 15-Dec-12 | 38,800,000 | 15-Dec-19 | 27,600,000 |

| | | | |
|---|---|---|---|
| 27 | | 15-Mar-07 | 48,000,000 | 15-Sep-09 | 44,000,000 |
| 28 | | 15-Apr-07 | 47,866,667 | 15-Dec-09 | 43,600,000 |
| 29 | | 15-May-07 | 47,733,333 | 15-Mar-10 | 43,200,000 |
| 30 | | 15-Jun-07 | 47,600,000 | 15-Jun-10 | 42,800,000 |
| 31 | | 15-Jul-07 | 47,466,667 | 15-Sep-10 | 42,400,000 |
| 32 | | 15-Aug-07 | 47,333,333 | 15-Dec-10 | 42,000,000 |
| 33 | | 15-Sep-07 | 47,200,000 | 15-Mar-11 | 41,600,000 |
| 34 | | 15-Oct-07 | 47,066,667 | 15-Jun-11 | 41,200,000 |
| 35 | | 15-Nov-07 | 46,933,333 | 15-Sep-11 | 40,800,000 |
| 36 | | 15-Dec-07 | 46,800,000 | 15-Dec-11 | 40,400,000 |
| 37 | | 15-Jan-08 | 46,666,667 | 15-Mar-12 | 40,000,000 |
| 38 | | 15-Feb-08 | 46,533,333 | 15-Jun-12 | 39,600,000 |
| 39 | | 15-Mar-08 | 46,400,000 | 15-Sep-12 | 39,200,000 |
| 40 | | 15-Apr-08 | 46,266,667 | 15-Dec-12 | 38,800,000 |
| 41 | | 15-May-08 | 46,133,333 | 15-Mar-13 | 38,400,000 |
| 42 | | 15-Jun-08 | 46,000,000 | 15-Jun-13 | 38,000,000 |
| 43 | | 15-Jul-08 | 45,866,667 | 15-Sep-13 | 37,600,000 |
| 44 | | 15-Aug-08 | 45,733,333 | 15-Dec-13 | 37,200,000 |
| 45 | | 15-Sep-08 | 45,600,000 | 15-Mar-14 | 36,800,000 |
| 46 | | 15-Oct-08 | 45,466,667 | 15-Jun-14 | 36,400,000 |
| 47 | | 15-Nov-08 | 45,333,333 | 15-Sep-14 | 36,000,000 |
| 48 | | 15-Dec-08 | 45,200,000 | 15-Dec-14 | 35,600,000 |
| 49 | | 15-Jan-09 | 45,066,667 | 15-Mar-15 | 35,200,000 |
| 50 | | 15-Feb-09 | 44,933,333 | 15-Jun-15 | 34,800,000 |
| 51 | | 15-Mar-09 | 44,800,000 | 15-Sep-15 | 34,400,000 |
| 52 | | 15-Apr-09 | 44,666,667 | 15-Dec-15 | 34,000,000 |

FROM FIG. 11B-1

FROM FIG. 11B-2

| | |
|---|---|
| 15-Dec-20 | 26,000,000 |
| 15-Dec-21 | 24,400,000 |
| 15-Dec-22 | 22,800,000 |
| 15-Dec-23 | 21,200,000 |
| 15-Dec-24 | 19,600,000 |
| 15-Dec-25 | 18,000,000 |

| | |
|---|---|
| 15-Jun-13 | 38,000,000 |
| 15-Dec-13 | 37,200,000 |
| 15-Jun-14 | 36,400,000 |
| 15-Dec-14 | 35,600,000 |
| 15-Jun-15 | 34,800,000 |
| 15-Dec-15 | 34,000,000 |
| 15-Jun-16 | 33,200,000 |
| 15-Dec-16 | 32,400,000 |
| 15-Jun-17 | 31,600,000 |
| 15-Dec-17 | 30,800,000 |
| 15-Jun-18 | 30,000,000 |
| 15-Dec-18 | 29,200,000 |
| 15-Jun-19 | 28,400,000 |
| 15-Dec-19 | 27,600,000 |
| 15-Jun-20 | 26,800,000 |
| 15-Dec-20 | 26,000,000 |
| 15-Jun-21 | 25,200,000 |
| 15-Dec-21 | 24,400,000 |
| 15-Jun-22 | 23,600,000 |
| 15-Dec-22 | 22,800,000 |
| 15-Jun-23 | 22,000,000 |
| 15-Dec-23 | 21,200,000 |
| 15-Jun-24 | 20,400,000 |
| 15-Dec-24 | 19,600,000 |
| 15-Jun-25 | 18,800,000 |
| 15-Dec-25 | 18,000,000 |

FROM FIG. 11B-3

FIG. 11B-4

FROM FIG. 11B-3

| | | | | |
|---|---|---|---|---|
| 53 | | 15-May-09 | 44,533,333 | 15-Mar-16 | 33,600,000 |
| 54 | | 15-Jun-09 | 44,400,000 | 15-Jun-16 | 33,200,000 |
| 55 | | 15-Jul-09 | 44,266,667 | 15-Sep-16 | 32,800,000 |
| 56 | | 15-Aug-09 | 44,133,333 | 15-Dec-16 | 32,400,000 |
| 57 | | 15-Sep-09 | 44,000,000 | 15-Mar-17 | 32,000,000 |

FIG. 11B-5

|    | A | B | C | D | E | F |
|----|---|---|---|---|---|---|
| 58 |   |   | 15-Oct-09 | 43,866,667 | 15-Jun-17 | 31,600,000 |
| 59 |   |   | 15-Nov-09 | 43,733,333 | 15-Sep-17 | 31,200,000 |
| 60 |   |   | 15-Dec-09 | 43,600,000 | 15-Dec-17 | 30,800,000 |
| 61 |   |   | 15-Jan-10 | 43,466,667 | 15-Mar-18 | 30,400,000 |
| 62 |   |   | 15-Feb-10 | 43,333,333 | 15-Jun-18 | 30,000,000 |
| 63 |   |   | 15-Mar-10 | 43,200,000 | 15-Sep-18 | 29,600,000 |
| 64 |   |   | 15-Apr-10 | 43,066,667 | 15-Dec-18 | 29,200,000 |
| 65 |   |   | 15-May-10 | 42,933,333 | 15-Mar-19 | 28,800,000 |
| 66 |   |   | 15-Jun-10 | 42,800,000 | 15-Jun-19 | 28,400,000 |
| 67 |   |   | 15-Jul-10 | 42,666,667 | 15-Sep-19 | 28,000,000 |
| 68 |   |   | 15-Aug-10 | 42,533,333 | 15-Dec-19 | 27,600,000 |
| 69 |   |   | 15-Sep-10 | 42,400,000 | 15-Mar-20 | 27,200,000 |
| 70 |   |   | 15-Oct-10 | 42,266,667 | 15-Jun-20 | 26,800,000 |
| 71 |   |   | 15-Nov-10 | 42,133,333 | 15-Sep-20 | 26,400,000 |
| 72 |   |   | 15-Dec-10 | 42,000,000 | 15-Dec-20 | 26,000,000 |
| 73 |   |   | 15-Jan-11 | 41,866,667 | 15-Mar-21 | 25,600,000 |
| 74 |   |   | 15-Feb-11 | 41,733,333 | 15-Jun-21 | 25,200,000 |
| 75 |   |   | 15-Mar-11 | 41,600,000 | 15-Sep-21 | 24,800,000 |
| 76 |   |   | 15-Apr-11 | 41,466,667 | 15-Dec-21 | 24,400,000 |
| 77 |   |   | 15-May-11 | 41,333,333 | 15-Mar-22 | 24,000,000 |
| 78 |   |   | 15-Jun-11 | 41,200,000 | 15-Jun-22 | 23,600,000 |
| 79 |   |   | 15-Jul-11 | 41,066,667 | 15-Sep-22 | 23,200,000 |

| | | | |
|---|---|---|---|
| 80 | | 15-Aug-11 | 40,933,333 |
| 81 | | 15-Sep-11 | 40,800,000 |
| 82 | | 15-Oct-11 | 40,666,667 |
| 83 | | 15-Nov-11 | 40,533,333 |
| 84 | | 15-Dec-11 | 40,400,000 |
| 85 | | 15-Jan-12 | 40,266,667 |
| 86 | | 15-Feb-12 | 40,133,333 |
| 87 | | 15-Mar-12 | 40,000,000 |
| 88 | | 15-Apr-12 | 39,866,667 |
| 89 | | 15-May-12 | 39,733,333 |
| 90 | | 15-Jun-12 | 39,600,000 |
| 91 | | 15-Jul-12 | 39,466,667 |
| 92 | | 15-Aug-12 | 39,333,333 |
| 93 | | 15-Sep-12 | 39,200,000 |
| 94 | | 15-Oct-12 | 39,066,667 |
| 95 | | 15-Nov-12 | 38,933,333 |
| 96 | | 15-Dec-12 | 38,800,000 |
| 97 | | 15-Jan-13 | 38,666,667 |
| 98 | | 15-Feb-13 | 38,533,333 |
| 99 | | 15-Mar-13 | 38,400,000 |
| 100 | | 15-Apr-13 | 38,266,667 |
| 101 | | 15-May-13 | 38,133,333 |
| 102 | | 15-Jun-13 | 38,000,000 |
| | | 15-Dec-22 | 22,800,000 |
| | | 15-Mar-23 | 22,400,000 |
| | | 15-Jun-23 | 22,000,000 |
| | | 15-Sep-23 | 21,600,000 |
| | | 15-Dec-23 | 21,200,000 |
| | | 15-Mar-24 | 20,800,000 |
| | | 15-Jun-24 | 20,400,000 |
| | | 15-Sep-24 | 20,000,000 |
| | | 15-Dec-24 | 19,600,000 |
| | | 15-Mar-25 | 19,200,000 |
| | | 15-Jun-25 | 18,800,000 |
| | | 15-Sep-25 | 18,400,000 |
| | | 15-Dec-25 | 18,000,000 |

FROM FIG. 11B'-2

| | | |
|---|---|---|
| 103 | 15-Jul-13 | 37,866,667 |
| 104 | 15-Aug-13 | 37,733,333 |
| 105 | 15-Sep-13 | 37,600,000 |
| 106 | 15-Oct-13 | 37,466,667 |
| 107 | 15-Nov-13 | 37,333,333 |
| 108 | 15-Dec-13 | 37,200,000 |
| 109 | 15-Jan-14 | 37,066,667 |
| 110 | 15-Feb-14 | 36,933,333 |
| 111 | 15-Mar-14 | 36,800,000 |
| 112 | 15-Apr-14 | 36,666,667 |
| 113 | 15-May-14 | 36,533,333 |
| 114 | 15-Jun-14 | 36,400,000 |
| 115 | 15-Jul-14 | 36,266,667 |
| 116 | 15-Aug-14 | 36,133,333 |
| 117 | 15-Sep-14 | 36,000,000 |

FIG. 11B'-3

| | A | B | C | D | E | F |
|---|---|---|---|---|---|---|
| 118 | | | 15-Oct-14 | 35,866,667 | | |
| 119 | | | 15-Nov-14 | 35,733,333 | | |
| 120 | | | 15-Dec-14 | 35,600,000 | | |
| 121 | | | 15-Jan-15 | 35,466,667 | | |
| 122 | | | 15-Feb-15 | 35,333,333 | | |
| 123 | | | 15-Mar-15 | 35,200,000 | | |
| 124 | | | 15-Apr-15 | 35,066,667 | | |
| 125 | | | 15-May-15 | 34,933,333 | | |
| 126 | | | 15-Jun-15 | 34,800,000 | | |
| 127 | | | 15-Jul-15 | 34,666,667 | | |
| 128 | | | 15-Aug-15 | 34,533,333 | | |
| 129 | | | 15-Sep-15 | 34,400,000 | | |
| 130 | | | 15-Oct-15 | 34,266,667 | | |
| 131 | | | 15-Nov-15 | 34,133,333 | | |
| 132 | | | 15-Dec-15 | 34,000,000 | | |
| 133 | | | 15-Jan-16 | 33,866,667 | | |
| 134 | | | 15-Feb-16 | 33,733,333 | | |
| 135 | | | 15-Mar-16 | 33,600,000 | | |
| 136 | | | 15-Apr-16 | 33,466,667 | | |
| 137 | | | 15-May-16 | 33,333,333 | | |
| 138 | | | 15-Jun-16 | 33,200,000 | | |
| 139 | | | 15-Jul-16 | 33,066,667 | | |

FROM FIG. 11B"-1

TO FIG. 11B"-3

| | | |
|---|---|---|
| 140 | 15-Aug-16 | 32,933,333 |
| 141 | 15-Sep-16 | 32,800,000 |
| 142 | 15-Oct-16 | 32,666,667 |
| 143 | 15-Nov-16 | 32,533,333 |
| 144 | 15-Dec-16 | 32,400,000 |
| 145 | 15-Jan-17 | 32,266,667 |
| 146 | 15-Feb-17 | 32,133,333 |
| 147 | 15-Mar-17 | 32,000,000 |
| 148 | 15-Apr-17 | 31,866,667 |
| 149 | 15-May-17 | 31,733,333 |
| 150 | 15-Jun-17 | 31,600,000 |
| 151 | 15-Jul-17 | 31,466,667 |
| 152 | 15-Aug-17 | 31,333,333 |
| 153 | 15-Sep-17 | 31,200,000 |
| 154 | 15-Oct-17 | 31,066,667 |
| 155 | 15-Nov-17 | 30,933,333 |
| 156 | 15-Dec-17 | 30,800,000 |
| 157 | 15-Jan-18 | 30,666,667 |
| 158 | 15-Feb-18 | 30,533,333 |
| 159 | 15-Mar-18 | 30,400,000 |
| 160 | 15-Apr-18 | 30,266,667 |
| 161 | 15-May-18 | 30,133,333 |
| 162 | 15-Jun-18 | 30,000,000 |

FIG. 11B"-3

FROM FIG. 11B"-2

| | | |
|---|---|---|
| 163 | 15-Jul-18 | 29,866,667 |
| 164 | 15-Aug-18 | 29,733,333 |
| 165 | 15-Sep-18 | 29,600,000 |
| 166 | 15-Oct-18 | 29,466,667 |
| 167 | 15-Nov-18 | 29,333,333 |
| 168 | 15-Dec-18 | 29,200,000 |
| 169 | 15-Jan-19 | 29,066,667 |
| 170 | 15-Feb-19 | 28,933,333 |
| 171 | 15-Mar-19 | 28,800,000 |
| 172 | 15-Apr-19 | 28,666,667 |
| 173 | 15-May-19 | 28,533,333 |
| 174 | 15-Jun-19 | 28,400,000 |
| 175 | 15-Jul-19 | 28,266,667 |
| 176 | 15-Aug-19 | 28,133,333 |
| 177 | 15-Sep-19 | 28,000,000 |

| | A | B | C | D | E | F |
|---|---|---|---|---|---|---|
| 178 | | | 15-Oct-19 | 27,866,667 | | |
| 179 | | | 15-Nov-19 | 27,733,333 | | |
| 180 | | | 15-Dec-19 | 27,600,000 | | |
| 181 | | | 15-Jan-20 | 27,466,667 | | |
| 182 | | | 15-Feb-20 | 27,333,333 | | |
| 183 | | | 15-Mar-20 | 27,200,000 | | |
| 184 | | | 15-Apr-20 | 27,066,667 | | |
| 185 | | | 15-May-20 | 26,933,333 | | |
| 186 | | | 15-Jun-20 | 26,800,000 | | |
| 187 | | | 15-Jul-20 | 26,666,667 | | |
| 188 | | | 15-Aug-20 | 26,533,333 | | |
| 189 | | | 15-Sep-20 | 26,400,000 | | |
| 190 | | | 15-Oct-20 | 26,266,667 | | |
| 191 | | | 15-Nov-20 | 26,133,333 | | |
| 192 | | | 15-Dec-20 | 26,000,000 | | |
| 193 | | | 15-Jan-21 | 25,866,667 | | |
| 194 | | | 15-Feb-21 | 25,733,333 | | |
| 195 | | | 15-Mar-21 | 25,600,000 | | |
| 196 | | | 15-Apr-21 | 25,466,667 | | |
| 197 | | | 15-May-21 | 25,333,333 | | |
| 198 | | | 15-Jun-21 | 25,200,000 | | |
| 199 | | | 15-Jul-21 | 25,066,667 | | |

FROM FIG. 11B'''-1

| | |
|---|---|
| 15-Aug-21 | 24,933,333 |
| 15-Sep-21 | 24,800,000 |
| 15-Oct-21 | 24,666,667 |
| 15-Nov-21 | 24,533,333 |
| 15-Dec-21 | 24,400,000 |
| 15-Jan-22 | 24,266,667 |
| 15-Feb-22 | 24,133,333 |
| 15-Mar-22 | 24,000,000 |
| 15-Apr-22 | 23,866,667 |
| 15-May-22 | 23,733,333 |
| 15-Jun-22 | 23,600,000 |
| 15-Jul-22 | 23,466,667 |
| 15-Aug-22 | 23,333,333 |
| 15-Sep-22 | 23,200,000 |
| 15-Oct-22 | 23,066,667 |
| 15-Nov-22 | 22,933,333 |
| 15-Dec-22 | 22,800,000 |
| 15-Jan-23 | 22,666,667 |
| 15-Feb-23 | 22,533,333 |
| 15-Mar-23 | 22,400,000 |
| 15-Apr-23 | 22,266,667 |
| 15-May-23 | 22,133,333 |
| 15-Jun-23 | 22,000,000 |

TO FIG. 11B'''-3

FROM FIG. 11B'''-2

| | | |
|---|---|---|
| 223 | 15-Jul-23 | 21,866,667 |
| 224 | 15-Aug-23 | 21,733,333 |
| 225 | 15-Sep-23 | 21,600,000 |
| 226 | 15-Oct-23 | 21,466,667 |
| 227 | 15-Nov-23 | 21,333,333 |
| 228 | 15-Dec-23 | 21,200,000 |
| 229 | 15-Jan-24 | 21,066,667 |
| 230 | 15-Feb-24 | 20,933,333 |
| 231 | 15-Mar-24 | 20,800,000 |
| 232 | 15-Apr-24 | 20,666,667 |
| 233 | 15-May-24 | 20,533,333 |
| 234 | 15-Jun-24 | 20,400,000 |
| 235 | 15-Jul-24 | 20,266,667 |
| 236 | 15-Aug-24 | 20,133,333 |
| 237 | 15-Sep-24 | 20,000,000 |

FIG. 11B'''-3

| | A | B | C | D | E | F |
|---|---|---|---|---|---|---|
| 238 | | | | | | |
| 239 | | | 15-Oct-24 | 19,866,667 | | |
| 240 | | | 15-Nov-24 | 19,733,333 | | |
| 241 | | | 15-Dec-24 | 19,600,000 | | |
| 242 | | | 15-Jan-25 | 19,466,667 | | |
| 243 | | | 15-Feb-25 | 19,333,333 | | |
| 244 | | | 15-Mar-25 | 19,200,000 | | |
| 245 | | | 15-Apr-25 | 19,066,667 | | |
| 246 | | | 15-May-25 | 18,933,333 | | |
| 247 | | | 15-Jun-25 | 18,800,000 | | |
| 248 | | | 15-Jul-25 | 18,666,667 | | |
| 249 | | | 15-Aug-25 | 18,533,333 | | |
| 250 | | | 15-Sep-25 | 18,400,000 | | |
| 251 | | | 15-Oct-25 | 18,266,667 | | |
| 252 | | | 15-Nov-25 | 18,133,333 | | |
| | | | 15-Dec-25 | 18,000,000 | | |

FIG. 11B''''

Setup Discount Table

Discounting Rates for Valuation of Flows

| Date* | Rate* | DFs | Zero rates |
|---|---|---|---|
| 11-Dec-06 | 4.868% | 1.0000 | 0.0487 |
| 11-Jun-07 | 4.868% | 0.9760 | 0.0487 |
| 11-Dec-07 | 4.868% | 0.9525 | 0.0487 |
| 10-Jun-08 | 4.868% | 0.9296 | 0.0487 |
| 10-Dec-08 | 4.868% | 0.9072 | 0.0487 |
| 10-Jun-09 | 4.868% | 0.8854 | 0.0487 |
| 10-Dec-09 | 4.868% | 0.8641 | 0.0487 |
| 10-Jun-10 | 4.868% | 0.8433 | 0.0487 |
| 10-Dec-10 | 4.868% | 0.8231 | 0.0487 |
| 10-Jun-11 | 4.878% | 0.8029 | 0.0488 |
| 10-Dec-11 | 4.886% | 0.7833 | 0.0489 |
| 9-Jun-12 | 4.895% | 0.7640 | 0.0489 |
| 9-Dec-12 | 4.902% | 0.7452 | 0.0490 |
| 9-Jun-13 | 4.913% | 0.7266 | 0.0491 |
| 9-Dec-13 | 4.923% | 0.7085 | 0.0492 |
| 9-Jun-14 | 4.934% | 0.6907 | 0.0493 |
| 9-Dec-14 | 4.945% | 0.6733 | 0.0494 |
| 9-Jun-15 | 4.956% | 0.6562 | 0.0496 |
| 9-Dec-15 | 4.965% | 0.6396 | 0.0497 |
| 8-Jun-16 | 4.978% | 0.6232 | 0.0498 |
| 8-Dec-16 | 4.989% | 0.6072 | 0.0499 |
| 8-Jun-17 | 5.002% | 0.5914 | 0.0500 |
| 8-Dec-17 | 5.014% | 0.5761 | 0.0501 |
| 8-Jun-18 | 5.025% | 0.5611 | 0.0503 |
| 8-Dec-18 | 5.035% | 0.5465 | 0.0504 |
| 8-Jun-19 | 5.048% | 0.5321 | 0.0505 |
| 8-Dec-19 | 5.059% | 0.5181 | 0.0506 |
| 7-Jun-20 | 5.070% | 0.5044 | 0.0507 |
| 7-Dec-20 | 5.080% | 0.4910 | 0.0508 |
| 7-Jun-21 | 5.089% | 0.4781 | 0.0509 |
| 7-Dec-21 | 5.097% | 0.4656 | 0.0510 |
| 7-Jun-22 | 5.102% | 0.4535 | 0.0510 |
| 7-Dec-22 | 5.106% | 0.4418 | 0.0511 |
| 7-Jun-23 | 5.111% | 0.4303 | 0.0511 |
| 7-Dec-23 | 5.116% | 0.4190 | 0.0512 |
| 6-Jun-24 | 5.121% | 0.4081 | 0.0512 |
| 6-Dec-24 | 5.126% | 0.3975 | 0.0513 |
| 6-Jun-25 | 5.131% | 0.3870 | 0.0513 |

FROM FIG. 11C-1

| | | | |
|---|---|---|---|
| 6-Dec-25 | 5.137% | 0.3768 | 0.0514 |
| 6-Jun-26 | 5.142% | 0.3669 | 0.0514 |
| 6-Dec-26 | 5.148% | 0.3572 | 0.0515 |
| 6-Jun-27 | 5.150% | 0.3480 | 0.0515 |
| 6-Dec-27 | 5.152% | 0.3390 | 0.0515 |
| 5-Jun-28 | 5.153% | 0.3302 | 0.0515 |
| 5-Dec-28 | 5.155% | 0.3217 | 0.0515 |
| 5-Jun-29 | 5.157% | 0.3134 | 0.0516 |
| 5-Dec-29 | 5.159% | 0.3053 | 0.0516 |
| 5-Jun-30 | 5.161% | 0.2973 | 0.0516 |
| 5-Dec-30 | 5.164% | 0.2896 | 0.0516 |
| 5-Jun-31 | 5.166% | 0.2820 | 0.0517 |
| 5-Dec-31 | 5.168% | 0.2747 | 0.0517 |
| 4-Jun-32 | 5.168% | 0.2677 | 0.0517 |
| 4-Dec-32 | 5.167% | 0.2609 | 0.0517 |
| 4-Jun-33 | 5.167% | 0.2543 | 0.0517 |
| 4-Dec-33 | 5.167% | 0.2478 | 0.0517 |
| 4-Jun-34 | 5.167% | 0.2415 | 0.0517 |
| 4-Dec-34 | 5.167% | 0.2353 | 0.0517 |
| 4-Jun-35 | 5.167% | 0.2293 | 0.0517 |
| 4-Dec-35 | 5.167% | 0.2235 | 0.0517 |
| 3-Jun-36 | 5.167% | 0.2178 | 0.0517 |
| 3-Dec-36 | 5.167% | 0.2123 | 0.0517 |
| 3-Jun-37 | 5.164% | 0.20701 | 0.05164 |
| 3-Dec-37 | 5.161% | 0.20190 | 0.05161 |
| 3-Jun-38 | 5.158% | 0.19693 | 0.05158 |
| 3-Dec-38 | 5.156% | 0.19209 | 0.05156 |
| 3-Jun-39 | 5.153% | 0.18737 | 0.05153 |
| 3-Dec-39 | 5.150% | 0.1828 | 5.150% |
| 2-Jun-40 | 5.147% | 0.1783 | 5.147% |
| 2-Dec-40 | 5.145% | 0.1739 | 5.145% |
| 2-Jun-41 | 5.142% | 0.1697 | 5.142% |
| 2-Dec-41 | 5.139% | 0.1655 | 5.139% |
| 2-Jun-42 | 5.136% | 0.1615 | 5.136% |
| 2-Dec-42 | 5.133% | 0.1576 | 5.133% |
| 2-Jun-43 | 5.130% | 0.1537 | 5.130% |
| 2-Dec-43 | 5.128% | 0.1500 | 5.128% |
| 1-Jun-44 | 5.125% | 0.1464 | 5.125% |
| 1-Dec-44 | 5.122% | 0.1428 | 5.122% |

FIG. 11C-2

METHODS FOR MEASURING HEDGING VALUE-AT-RISK AND PROFITABILITY

BACKGROUND

This disclosure relates generally to methods for providing financial services and more particularly to methods for measuring value-at-risk and profitability of hedging.

Referring to FIG. 1, long term fixed rate funding has been the preferred method of debt issuance in the municipal market. Over the last several years, municipalities have become more comfortable with the concept of issuing floating rate debt and using swaps to achieve a significantly lower cost of funds. To hedge this floating obligation, municipalities can swap out their floating rate obligations to a fixed coupon using the Bond Market Association Municipal Swap Index™ (hereinafter, "BMA"). The BMA is the principal benchmark for floating rate interest payments for tax-exempt issuers. The BMA is a national rate based on approximately 250 high-grade, seven-day tax-exempt variable demand obligation issues of $10 million or more.

Referring to FIG. 2, issuers have begun to use a Percentage of Libor (POL) to hedge their tax-exempt variable rate obligations as an alternative to the BMA. Libor ("London Interbank Offered Rate") is a taxable rate used by banks for short term funding and is the most common, liquid index used in the swap market. The tax exempt equivalent rate is converted by taking one minus the marginal tax rate. If the marginal tax rate is 35%, tax-exempt yields should be at least 65% of taxable yields. This relationship generally holds in the more efficient short-end of the tax-exempt curve where the BMA has averaged approximately 66% over the last 10 years. Moving out on the yield curve, however, this ratio does not hold constant thus creating an arbitrage opportunity. Long term rates reflect less liquidity, more varied credits and most importantly, compensation for taking tax risk.

However, currently available systems do not provide adequate information regarding the risk existing in portfolios of POL swap hedges. Currently, available analysis tools are inadequate and often inhibit use of POL swap hedges.

SUMMARY

Certain embodiments of this disclosure address the shortcomings of current financial analysis systems. Systems and methods are provided for measuring value-at-risk and profitability of hedging in relation to BMA debt obligations. Rigorous, statistical solutions are provided that address problems observed in the provision of financial services and, in particular, problems associated with municipalities involved in swap hedging face. Aspects of this disclosure permit users to quantify POL hedging basis risk through a VAR-style loss measurement and statistics measuring the profitability of a hedge, those statistics including gain durability and gain/loss ratio. Aspects of this disclosure introduce significant innovation to risk management practices, particularly for tax-exempt issuers of debt.

Certain embodiments of this disclosure facilitate better management of hedging risk. Users can analyze the benefits and detriments of executing new hedges using POL vs. BMA. Certain embodiments of this disclosure also provide guidance for analyzing the risk existing in an existing portfolio of POL swap hedges. Better measurements of this risk can inform decisions to go to the market to either take on more hedging risk for potential profit or lay off risk.

BRIEF DESCRIPTION OF THE DRAWINGS

FIGS. 5a and 5b illustrate examples of transaction information entry tables;

FIG. 8 illustrates a tax change risk parameter entry table;

FIG. 9 illustrates an example of results produced by certain embodiments of this disclosure.

FIGS. 11A-11C are linked spreadsheets illustrating an example calculation conducted in accordance with one embodiment of this disclosure, and include the various segments of linked spreadsheets in FIGS. 11A-1 through 11A-7; 11B-1 through 11B-5; 11B'-1 through 11B'-3; 11B"-1 through 11B"-3; 11B'"-1 through 11B'"-3; 11B""; 11C-1; and 11C-2.

DETAILED DESCRIPTION

Embodiments of this disclosure will now be described in detail with reference to the drawings, which are provided as illustrative examples so as to enable those skilled in the art to practice various aspects of this disclosure. Notably, the figures and examples below are not meant to limit the scope of this disclosure to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of various aspects of this disclosure will be described, and detailed descriptions of other portions of such known components will be omitted so as not to obscure the inventive concept. In the present specification, an embodiment showing a singular component should not be considered limiting; rather, aspects of this disclosure are intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, aspects of this disclosure encompass present and future known equivalents to the components referred to herein by way of illustration.

Figure 1:
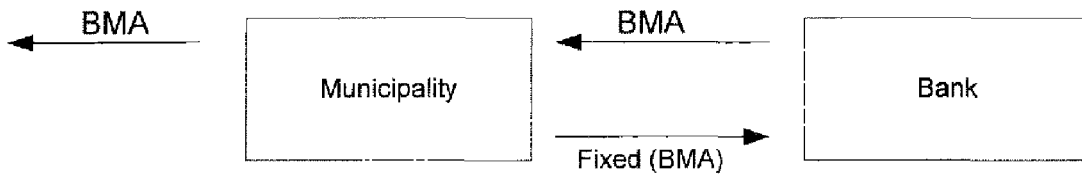
FIG. 1 is schematic depicting hedging with BMS swaps.
Figure 2:
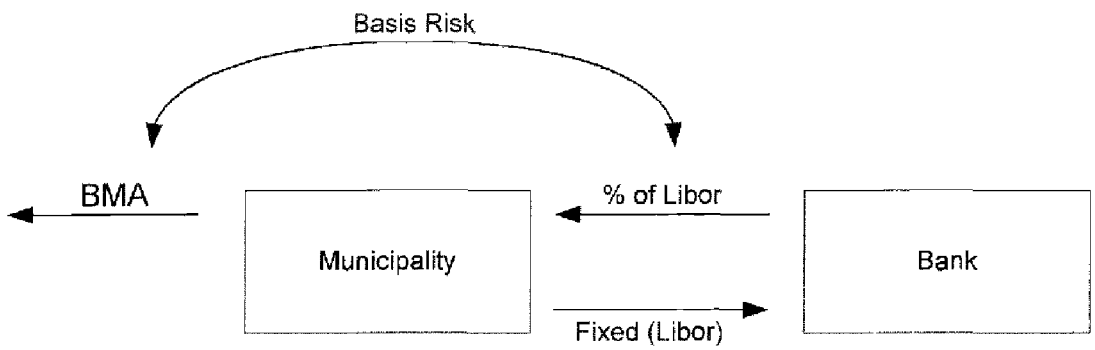
FIG. 2 is a schematic depicting hedging with percentage of Libor swaps.
Figure 3:
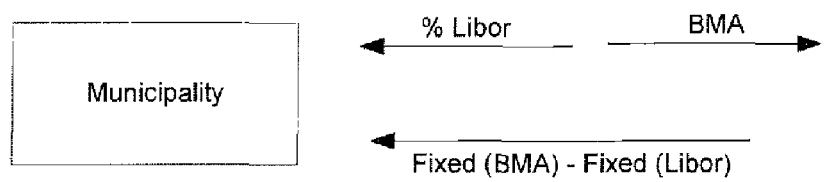
FIG. 3 is a schematic depicting flows in BMA and POL swaps.

With reference to FIG. 3, certain embodiments of this disclosure facilitate the formulation of an analysis of a plurality of factors that municipalities must typically consider when determining a hedging strategy, including:

1. The degree of extra risk taken, if any, by hedging with POL swaps vs. BMA swaps.
2. The level of extra expected gain (return) of hedging with POL swaps vs. BMA swaps.
3. The portfolio of POL swaps and Libor swaps that optimizes a municipalities' risk-return profile During such analysis, a municipality typically strives to understand the trade-offs between the incremental expected cash flow benefit and the incremental risk accepted via the POL hedge. The expected cash flow benefit can be computed with an acceptable spread projection model. The risk can be quantified by computing the volatility of the expected cash flow projection. To extract out the incremental risk in the POL hedging strategy, the flows in the BMA swap scenario can be subtracted from those in the POL swap scenario in order to obtain a remaining flow.

The difference in the fixed rates represents gains (if positive) or losses (if negative) will typically be derived from accepting the fixed leg of the POL swap over the fixed leg of a BMA swap. Generally speaking, the POL hedge would not make sense if its swap rate were not lower than the swap rate of the BMA trade. Otherwise, there would be no significant expected gain to be had for the extra risk being accepted.

The difference in the floating rates represents incremental gains or losses than may be realized by booking a POL hedge. Cash flow risk is embedded in this floating spread. From a valuation perspective, certain sources of risk can impact the value of these flows. The sources of risk can include:
  Risk A: Basis risk between POL and BMA.
  Risk B: Federal tax code change risk.
  Risk C: Interest-rate risk that impacts the present valuation of the stream of fixed and floating flows.

When cash flows are of principal interest, such that direction of flows rather than the current valuation of flows is under consideration, Risk C becomes less important since it will only act to scale the size of the projected cash flows, and will not change their directions. Accordingly, certain embodiments focus analysis on Risk A and Risk B where, for example, modeling Risk C adds a significant degree of modeling complexity.

In certain embodiments, a Base Model is provided that can capture market risk. An analysis using the Base Model typically requires properly modeling the basis risk between POL and BMA rates. According to certain aspects of this disclosure, the Base Model uses an auto-regressive 2-lag paradigm ("AR(2)"). The Base Model can be calibrated using a history of behaviors. In one example, behavior observable in the preceding 10 years of BMA and 1, 3, 6, and 12-month Libor data can be used to calibrate the Base Model. As a result, the model may express spread dynamics exhibited in the history that was used for calibration. It will be appreciated that differing lengths of calibration history can cause the model to express different aspects of spread dynamics.

AR(2) suggests that the expected progression of the POL-BMA spread depends partly on the spread observed at one period before and partly on the spread observed at two periods before plus a random "white noise" component. In certain embodiments, the white noise left by the AR(2) predictions is reasonably sequentially independent (based on auto correlation diagrams) and approximately normal (based on a chi-squared test and normal scoring) and, therefore, the model can be used to forecast spreads and place confidence bands around the forecast. The mathematical form of the model can be expressed as:

$$S_t = \rho_A S_{t-1} + (\rho_B - \rho_A^2) S_{t-2} + dz_1$$

where,
  $S_t$ is the predicted POL-BMA spread at time t
  $\rho_A$ is the one-lag correlation
  $\rho_B$ is the two-lag correlation, and
  $dz_t$ is the white noise, approximately $N(O, \sigma_t)$ and sequentially independent.

The model permits the projection of POL-BMA spreads to any forward point (i.e., net cash flow predictions), and attachment of a confidence band around these predictions. The model recognizes that, stepping out in time, the predictions become less certain, and therefore, predictions obtained may carry less weight. The model can provide an expected rate of cash flow gains and losses, and the standard deviation of those expectations. In other words, the model can provide quantitative measures of factors 1 and 2 above.

In certain embodiments, a tax code change risk can be added to the Base Model. The base AR(2) model, as described above, typically accounts for Risk A, which is an interest rate basis risk, because the model described above has been initially calibrated with 10 years of BMA and Libor history and which may not include the impact of major tax code changes. Even if the impact of major tax code changes was included, its effect is typically extracted from the calibration because past changes are unlikely to provide a reliable indication of the size and timing of potential future changes. Tax law risk may be added to the model as a separate calculation. The risk can be modeled in two parts. First, a user may be asked to provide an opinion on the probability of a tax rate change in the next 5 years. This probability can be used to calibrate an exponential distribution that models the likelihood of an event occurring within any particular amount of time. The exponential distribution is typically used to model the timing of uncertain events. Second, the magnitude of the tax change may be assumed to follow a normal distribution with an expected size and a volatility that can also be provided by the user. Any increases in risk caused by tax rate uncertainty are captured, based on these modeling assumptions, in the risk-return metrics as discussed below.

In certain embodiments, risk-return trade-offs can be quantified. Specifically, the further step of defining a risk-return statistic may be taken to facilitate eventual optimization of an analysis. In certain embodiments, for example, the Sharpe Ratio can be used. The Sharpe Ratio, as is known in the art, can risk-weight expected returns of a financial position. The Sharpe Ratio can be expressed as a return divided by the standard deviation of the return. The higher this ratio, the more certain are the gains one obtains.

$$\text{Sharpe Ratio} = \text{Expected Return}/\sigma_{Return}$$

Generally, a Sharpe Ratio of 1.0 or more is considered to be good. In certain embodiments, the Sharpe Ratio can be calculated for cash flow projections out to any time horizon specified by the user. Typically, the average of a series of Sharpe Ratios calculated out to transaction maturity is obtained to produce a single number by which to measure the attractiveness of a single transaction.

In certain embodiments, a second measurement that may be considered is the probability that a gain will be realized in a cash position. This consideration includes an assessment of level of security of potential gains. The assessment can be measured as a statistic labeled Gain Durability (GD) and defined as follows:

GD=Probability expected gain will be realized or exceeded

In certain embodiments, this probability for each projected cash flow is calculated. A composite statistic defined to be the average GD across all cash flows can also be computed. Typically, an average GD closest to 100% is best, whereas a GD of 50% represents a coin flip that would not be a good investment for the general risk-averse investor. One minus GD is a measure of the probability that a loss will be incurred.

A third method for quantifying the risk-return trade-off includes considering the option components that make up the expected future cash flow. In the flow schema according to certain aspects of this disclosure, the incremental fixed coupon gain in the POL hedge can be considered as representing a strike level. The BMA-POL spread is the stochastic market factor. If the spread ends up below the strike level, the municipality ends up with a cash flow gain; if the spread rises above the strike level, municipality ends up with a cash flow loss. In other words, each projected flow can be broken down synthetically into a purchased put and a sold call (i.e., a risk reversal). The value of the purchased put represents the size of the potential gains to be had in the cash flow position. The value of the sold call represents the size of the potential losses inherent in the cash position.

Using the model volatility associated at each future date with the BMA-POL spread, these put and call values can be calculated and used to define a measurement, referred to herein as Gain/Loss Ratio ("GLR"). This statistic can be defined as the log of the ratio of potential gains to potential losses:

GLR=Log(Put Value/Call Value)

Typically, large positive values are sought, which would indicate that the returns (potential gains) of a position are greater than the risk (potential losses). A GLR of zero may indicate that the risks exactly balance the gains, and so the investment is equivalent to a coin flip. It will be appreciated that most risk-averse investors would not enter into such a transaction. A negative GLR means that the investment is likely to lose money, and should not be accepted. Certain embodiments calculate GLRs for each projected flow out to any horizon, and also a composite GLR that takes the sum of put values and sum of call values across all cash flows as inputs into the statistic. This composite GLR can provide a single number that indicates the attractiveness of a transaction.

The three statistics can provide three opinions on the attractiveness of a single POL hedge. As decision-making devices, they may be best used in tandem. If all agree that the transaction is "good," then likely it will be, and vice versa. If there is disagreement between the three measures, the transaction can be considered a borderline strategy.

In certain embodiments of this disclosure, the model also provides an estimate of Value-at-Risk ("VAR")—the maximum loss amount that could be incurred over some horizon and within some confidence interval ("CI"), where both parameters are supplied by a user. For example, if the user wishes to estimate a 99 out of 100 worst-case loss scenario (i.e., "99% CI") over the next three months, the relevant parameters can be provided and the model will stress market risk and tax risk variables accordingly, and assess the value of the hedge as of the horizon date. VARs typically are used to define risk appetites, and to provide managers a quantitative measurement with which to limit the market risk that they assume. Additionally, since the hedging strategy assumed by the model is unidirectional (hedging swap is always receive POL and pay fixed, which hedges BMA obligations to investors), VARs across multiple trades can be generally summed for an approximate portfolio VAR without worrying about netting offsets that would exist in a mixed portfolio. Therefore, the VAR measurement can be used to make a risk assessment of the whole portfolio, not just for a single transaction.

Certain embodiments of this disclosure comprise a model that includes both the transaction-level and aggregate VAR amounts for the set of trades input by the user. The VAR estimate is based on a simulation of three modeled market variables: the BMA-Libor spread, the probability of a tax rate change occurrence within some time period, and the magnitude of the tax rate change. In certain embodiments, users can specify how many scenarios to run. In one example, up to 500,000 scenarios are permitted. A higher number of scenarios can increase accuracy, but will typically result in longer processing times. The user will typically balance these costs and benefits in choosing the scenario count. Because the VAR is estimated through a simulation, some statistical noise may exist in the calculation. Consequently, one instance of a run may not produce precisely the same result as a second instance although results will typically fall within relatively small margins. Depending on the simulation parameters chosen, statistical noise will typically cause a variation of between ±2-6% from the "true" VAR value. To keep statistical noise at a minimum, certain embodiments provide a limit to the number of scenarios that can be set to be not less than 300,000.

Figure 4:
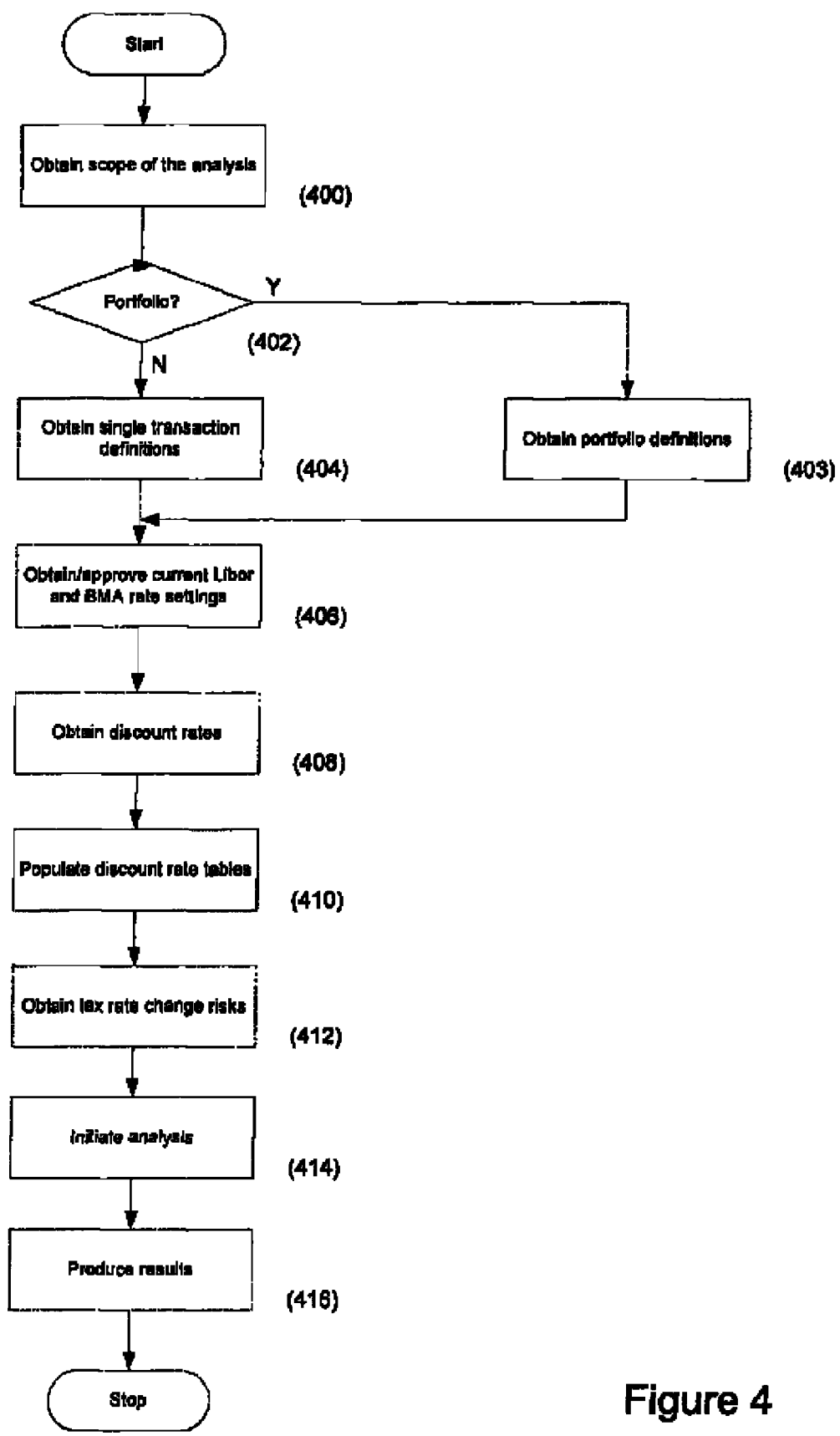
FIG. 4 is a flowchart of an example of an analysis process according to aspects of this disclosure.

FIGS. 4-9 illustrate operation of a system according to certain aspects of this disclosure. Referring to FIG. 4, a user requesting an analysis may provide general identifying information and parameters outlining the scope of analysis at step 400. Examples of input tables for capturing certain information and parameters are provided in FIGS. 5*a* and 5*b*. Parameters can include a date of analysis, and whether a single transaction analysis or analyses of a portfolio of transactions is required. In the latter instance, plural transactions are typically defined in a portfolio definition table. An example of a POL trade definition table 50 for a single trade (e.g., Trade No. 1) is provided in FIG. 5*a*. Information that may be collected can include start date 500 and end date 502 of a hedge transaction where end date 502 can be defined as the date of last flow of the hedge transaction. Collected information can also include swap spread gain 504 (measured in basis points) that quantifies the swap spread difference between percentage of the Libor and the BMA swap as of trade date and the periodicity for the hedge transaction 506 (Monthly, Quarterly, Semi-annually or Annually). Based on the trade illustrated by table 50, the VAR may be calculated to a dollar value at risk within a user specified probability (e.g., assuming the user inputs a CI of 99%, worst case loss scenario one might calculate a dollar value at risk of $8,689,590, for example). FIG. 5*b* depicts an example of an input table 52 that can be used to input an amortization schedule. The table in FIG. 5*b* shows outstanding principle for the associated period for the swap. In one example, input cells can be available for defining up to 50 trades, although this number is not intended to be limiting. If at step 402 it is determined that a portfolio analysis is sought, then information associated with multiple transactions is entered at step 403; otherwise information regarding a single transaction is obtained at step 404.

Figure 6:
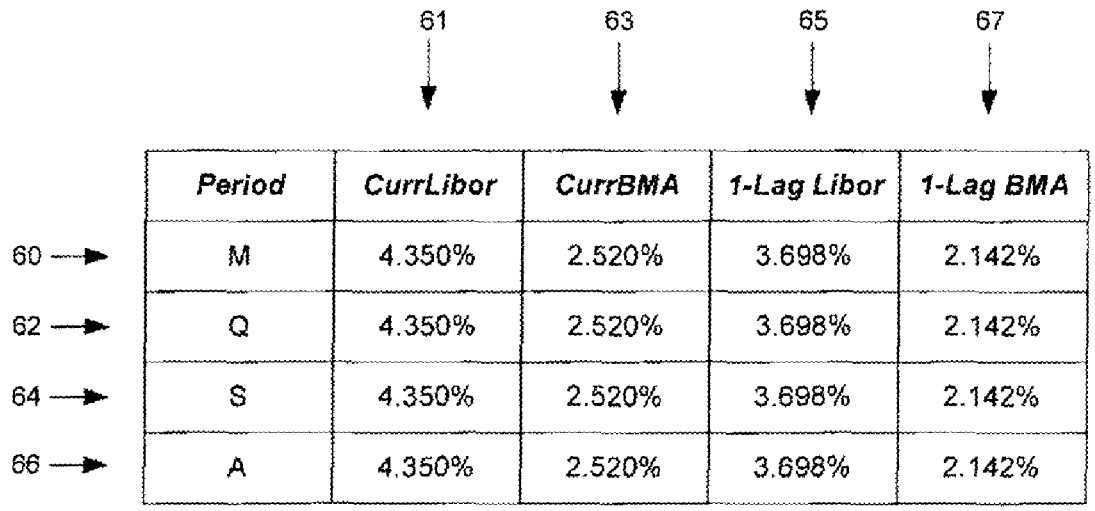
FIG. 6 illustrates a current market rate information entry table.

At step 406, the user can provide and approve current Libor or BMA rate settings. The user may enter desired rate settings, may select settings from a list or range of options or can either approve or amend rate settings suggested by the system. FIG. 6 depicts an example of a current market rate entry table. Rate inputs define the starting BMA-Libor spread of the model from which future spreads are projected. The user can confirm validity of the inputs which include Libor 61 and 65 and BMA 63 and 67 rates for a current period 61 and 63 and for a previous period 65 and 67, where the previous period rates may represent values applicable in a previous Month (M) 60, Quarter (Q) 62, Six months (S) 64 or Year (A) 66, and so on. The user can also confirm that the percentage rate applied to POL swaps is current. Typically, these rates need to be changed on a periodic basis or after a large move in rates that significantly alters them.

Figure 7:
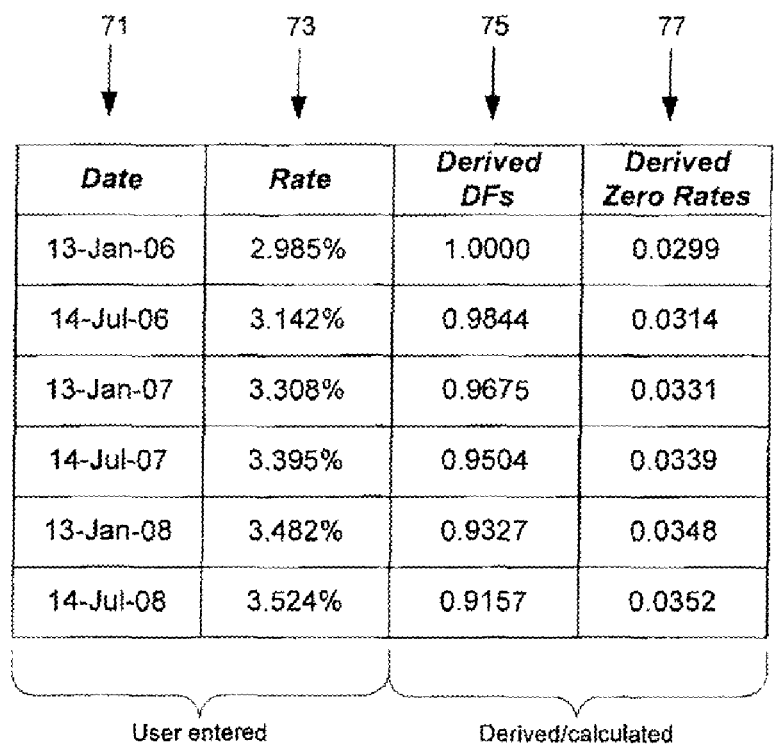
FIG. 7 illustrates a discounting rate information entry table.

At step 408, the user can confirm the discount rates for generating a discount curve. A partial view of one example of a discounting rates entry table is shown in FIG. 7. A user will typically ensure that the rates reflect current values. The rates shown in the example can be used to measure VAR and the user can provide dates 71 and rates 73 deemed appropriate for valuing future flows. In certain embodiments, data in columns 71 and 73 (i.e., date and rate) can be mathematically manipulated to provide certain calculated results, such as Discount Factor (DF) shown in column 75 and zero rates 77, for example. At step 410, a "Setup Discount Table" process can be executed to populate additional values of the rate table automatically. It will be appreciated that date points are set at intervals selected to permit rates for intervening dates to be estimated through interpolation. In one example, the discounting rate table can include 300 rows for setting up discount rates.

At step 412, tax rate change risks can be modeled. FIG. 8 provides an example of a tax rate change modeling parameters entry table. The parameters include probabilities of tax rate changes over a specified period; the period in the example is 5 years. Typically, a user will enter a best estimate of the probability 80 that a tax rate change will occur within the specified period (i.e. the next five years). The user may also enter an expected size of the tax rate change 82, should such tax rate change occur within the specified period. The user may also enter a best estimate of 90% confidence bands 84 around the expected tax change size. For example, a 3% input indicates that the user believes with 90% confidence that if a tax rate change occurs, the change will be no greater than 3% above the entered expected rate tax change 82 and no less than 3% below the entered expected tax rate change 82. In the example depicted in FIG. 8, the 90% confidence band lies between −6% and 0%.

At step 414, the user can initiate an analysis of a single deal or can run VAR on a portfolio of deals. Typically, the user identifies the deal or portfolio and issues an instruction to execute. In some embodiments, a graphical user interface includes a graphical button that permits the user to initiate execution. In certain embodiments, execution can be initiated at a preconfigured, selected or otherwise programmed time.

At step 416, the user receives results that can include Risk-Return metrics and VAR results for the specified deal or portfolio. These results can be presented in a report, in a database, in a spreadsheet and in other formats configured for the requesting user. The results may also be printed, faxed, E-mailed, transmitted through a network or imported by a computer for further processing. In certain embodiments, the results are presented directly to the user in a graphical user interface. FIG. 9 depicts a simplified presentation of the results in one example, whereby a matrix of statistics is provided comprising gain/loss ratios 90, gain durabilities 92 and Sharpe ratios 94 calculated with no tax risk 91, with tax risk 93 and at break-even 95. Other information can be provided including, for example, an estimate of value at risk in the deal 96 (e.g., −$9,919,751 USD in the given example).

Certain embodiments of this disclosure provide tools that assist investors, institutions and financial advisers in developing hedging strategies. Analyses produced by various embodiments may be used in a variety of additional applications such as marketing.

Figure 10:
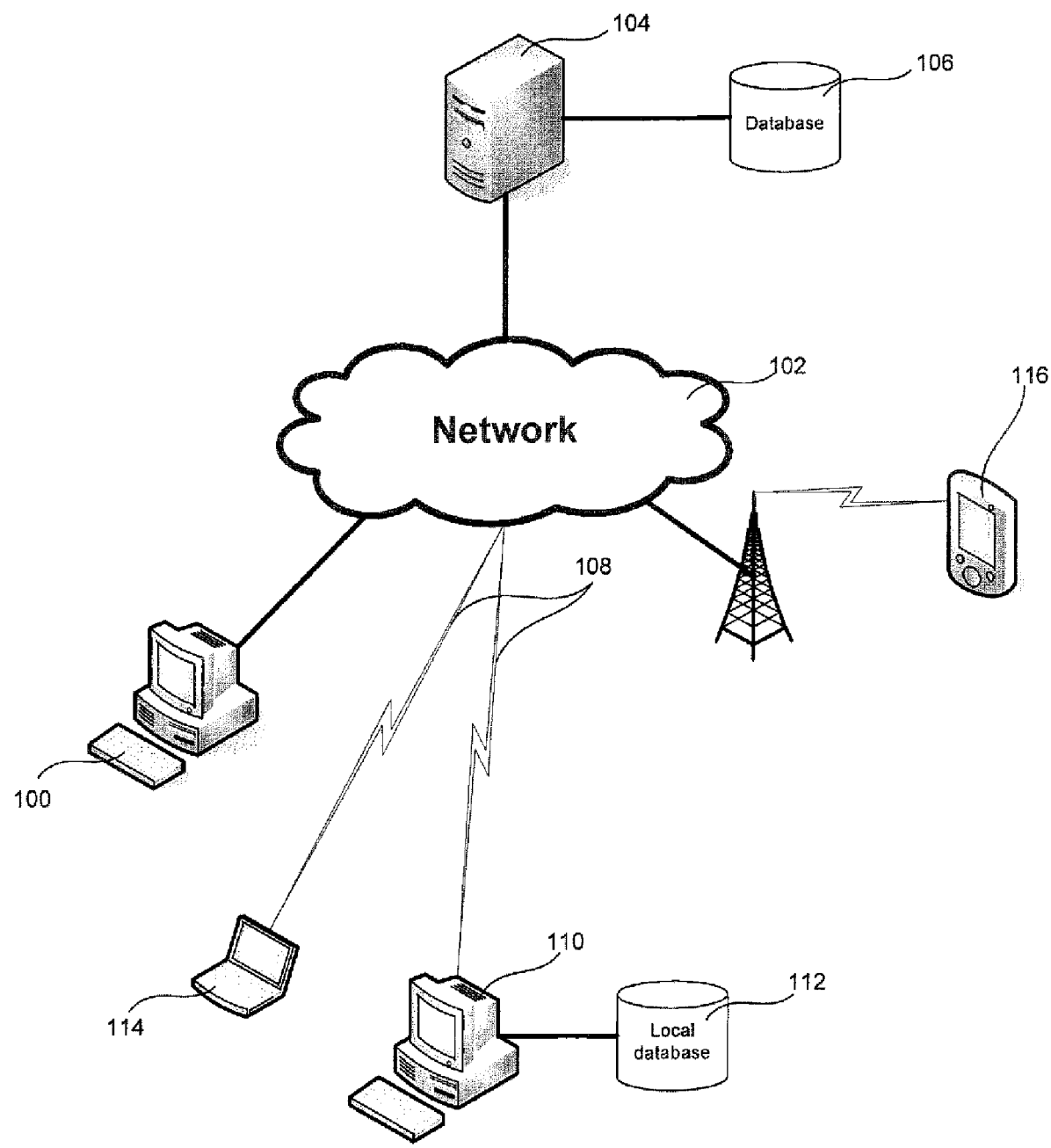
FIG. 10 is a generalized schematic of systems that perform analyses according to aspects of this disclosure.

With reference to FIG. 10, certain embodiments of this disclosure employ conventional computer systems and applications to process information obtained from a requesting user and to perform an analysis as described above. Computer systems can be conventional desktop computers 100, 110. Some embodiments employ a computer 100 that interacts with one or more requesting users to obtain sufficient information to perform an analysis. Information may be entered through any suitable means, including a spreadsheet, HTML, XML or other web-compatible pages and forms, database query, formatted text or through interrogation by a custom application. It will be appreciated that some embodiments may employ several entry means in various combinations.

FIGS. 11A-11C are spreadsheets illustrating an example calculation conducted in accordance with one embodiment. As an aid to readability, these Figures have been broken up into linked spreadsheets 11A-1 through 11A-7; 11B-1 through 11B-5; 11B'-1 through 11B'-3; 11B"-1 through 11B"-3; 11B'"-1 through 11B'"-3; 11B'"; 11C-1; and 11C-2. The flow and interrelationship between spreadsheet segments is indicated on the various drawing Figures.

In certain embodiments, computer systems may be capable of executing an analysis without interacting with other computers or communicating by network. In such embodiments, computers 100, 110 and 114 can be preloaded with sufficient information to perform an analysis. Locally maintained databases 112 and other storage may maintain tables and histories of relevant information. In certain embodiments, a computer system 100 may be connected to a network 102 with ready access to one or more remote servers 104 and databases 106 from which information can be obtained to support analyses. In certain embodiments, network 102 may provide access to specialized information services (not shown) that can process queries and other requests, to obtain relevant or specific sets of data, preprocess certain information and perform portions of the analysis. In at least some embodiments, a server 104 may receive information circumscribing the scope of a requested analysis and can perform the requested analysis. Results can then be presented to a requesting user through any suitable network device including computers 100, 110, 114 and mobile communications devices 116 such as PDAs, Email clients and suitably provisioned cellular telephones. In certain embodiments, computer devices 110 and 114 may receive periodic updates from one or more remote servers 104 and databases 106.

Data entry and results presentation processes can utilize existing or commonly available resources and applications provided on computing devices 100, 110, 114 and 116. In certain embodiments, software applications, procedures, macros and utilities can be created to perform part or all of the analysis as a standalone application, as a script or as a command language integrated in and commercially available database, spreadsheet or other application. In certain embodiments a combination of custom applications, applets, scripts and macros may be provided to support a variety of user devices including mobile communications devices 116, computers 100, 110, 114 and so on. Likewise, custom user interfaces may be provided, particularly for resource-constrained devices including certain mobile communications devices 116. For example, a downloadable Java applet can be provided to facilitate use of mobile communications devices 116. In many embodiments, customized forms and pages can be provided to enable data input and results presentation within existing or commercially available applications. In certain embodiments, other methods of data entry are supported, including voice response systems configured to interrogate a requesting user for relevant information that can be transcribed or processed using voice recognition systems. Results may also be delivered in printed form, by Email and by facsimile or other similar transmission.

Although the present disclosure has been described with reference to specific exemplary aspects and embodiments, it will be evident to one of ordinary skill in the art that various modifications and changes may be made to these embodiments without departing from the broader spirit and scope of this disclosure. Accordingly, the specification and drawings are to be regarded in an illustrative rather than a restrictive sense.

What is claimed is:

1. A computer-implemented method for estimating risk in financial transactions, comprising:
   receiving, in a processor, information defining an industry average interest rate used by banks for short term funding and a principal benchmark for a floating rate interest payments for tax-exempt issuers associated with a transaction, the information including respective rate settings and a current swap spread difference between a percentage of the industry average interest rate and the principal benchmark;
   inputting, through a user interface to the processor, discount rates confirmed by a user to be used by the processor;
   using the confirmed discount rates to populate one or more discount rate tables stored in a memory operatively coupled to the processor;
   producing, via the processor, an analysis at least comprising calculating value at risk (VAR) and one or more risk-return metrics for the transaction using the current swap spread difference;
   generating, via the processor, a discount curve for the transaction, wherein the VAR includes a measurement of risk based on the inputted discount rates and the discount rate tables; and
   outputting, from the processor, an analysis result to the user.

2. The method of claim 1, and further comprising modeling, in the processor, a risk of tax rate change to obtain a calculated risk of tax change, wherein the analysis is adjusted based on a calculated risk of tax change.

3. The method of claim 1, wherein the analysis is produced using a computer-implemented model configured to capture market risk.

4. The method of claim 3, wherein the computer-implemented model comprises an auto-regressive 2-lag paradigm.

5. The method of claim 3, wherein the computer-implemented model is calibrated using histories of behaviors associated with the industry average interest rate and the principal benchmark.

6. The method of claim 5, wherein the length of one or more of the histories is adjusted to express different aspects of spread dynamics associated with the computer-implemented model.

7. The method of claim 5 further comprising modeling, via the processor, a risk of tax rate change to obtain a calculated risk of tax change, wherein the analysis is adjusted in correspondence with the calculated risk of tax change.

8. The method of claim 7, wherein modeling the risk of tax rate change comprises:
   obtaining an opinion on the probability of occurrence of a tax rate change within a selected time period, and
   estimating, in the processor, a magnitude of an occurring tax rate change.

9. The method of claim 1, wherein said producing an analysis comprises quantifying the risk-return metrics as a Sharpe Ratio.

10. The method of claim 1, wherein said producing an analysis includes quantifying the risk-return metrics as an assessment of a level of security of potential gains in a cash position.

11. The method of claim 1, wherein said producing an analysis comprises using the processor to synthesize purchased put and sold calls corresponding to expected future cash flows associated with the percentage of the industry average interest rate and the principal benchmark.

12. A system for estimating risk in financial transactions, comprising:
   a model configured to model basis risk between percentage of a percentage of an industry average interest rate and a principal benchmark for a floating rate interest payments for tax-exempt issuers associated with a financial transaction;
   a plurality of input tables populated with parameters of the financial transaction including one or more discount rate tables stored in a memory;
   storage configured to maintain a history of the percentage of the industry average interest rate and the principal benchmark rate;
   a user interface configured to input discount rates to a processor operatively coupled to the memory,
   wherein the processor is programmed to produce an analysis of risk-return metrics and value at risk (VAR) for the transaction, based on the model, the plurality of input tables and the history,
   wherein the processor is further configured to generate a discount curve for the transaction as determined by the inputted discount rates, and wherein the VAR includes a measurement of risk determined by the inputted discount rates.

13. A system according to claim 12, wherein
   the model is further configured to obtain a calculated risk of tax change, and
   the processor is further programmed to adjust the analysis based on the calculated risk of tax change.

14. A system according to claim 13, wherein the parameters include an opinion on the probability of occurrence of a tax rate change within a selected time period and an estimated magnitude of the tax rate change and wherein the calculated risk of tax change is computed from the probability opinion and the estimated magnitude.

15. A system according to claim 14, wherein the risk-return metrics are produced an assessment of a level of security of potential gains in a cash position.

16. A system according to claim 15, wherein the risk-return metrics are produced as a Sharpe Ratio.

17. A system according to claim 16, wherein the processor is further configured to produce synthetic purchased put and sold calls corresponding to expected future cash flows of the industry average interest rate and the principal benchmark.

* * * * *